United States Patent
Barnes et al.

(10) Patent No.: US 7,780,756 B2
(45) Date of Patent: Aug. 24, 2010

(54) ORE REDUCTION PROCESS AND TITANIUM OXIDE AND IRON METALLIZATION PRODUCT

(75) Inventors: John James Barnes, Hockessin, DE (US); Stephen Erwin Lyke, Wilmington, DE (US); Dat Nguyen, Chadds Ford, PA (US); Akira Uragami, Hyogo (JP); Isao Kobayashi, Hyogo (JP); Mitsutaka Hino, Miyagi (JP); Thomas Peter Battle, West Chester, PA (US); Joseph M. Shekiro, Jr., Newark, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 12/430,261

(22) Filed: Apr. 27, 2009

(65) Prior Publication Data

US 2009/0217784 A1    Sep. 3, 2009

Related U.S. Application Data

(63) Continuation of application No. 11/512,993, filed on Aug. 30, 2006, now abandoned.

(60) Provisional application No. 60/712,556, filed on Aug. 30, 2005, provisional application No. 60/788,173, filed on Mar. 31, 2006.

(51) Int. Cl.
| C22B 1/14 | (2006.01) |
| C22B 1/00 | (2006.01) |
| C22B 1/16 | (2006.01) |
| C21B 3/04 | (2006.01) |
| C21B 13/10 | (2006.01) |

(52) U.S. Cl. .............. 75/316; 75/435; 75/485; 75/751

(58) Field of Classification Search .............. None
See application file for complete search history.

(56) References Cited

U.S. PATENT DOCUMENTS 2,885,280 A    5/1959    Greffe (Continued)

FOREIGN PATENT DOCUMENTS

GB    1087027    10/1967

(Continued)

OTHER PUBLICATIONS

EPO Search Report, Sep. 17, 2008.

(Continued)

*Primary Examiner*—Melvin C Mayes
*Assistant Examiner*—Sarah Van Oudenaren (57) ABSTRACT

The disclosure is directed to a process for producing separable iron and titanium oxides from an ore containing titanium oxide and ferric oxide, comprising: (a) forming agglomerates comprising carbon-based materials and the ore, the quantity of carbon of the agglomerates being sufficient for, at an elevated temperature, reducing ferric oxide to ferrous oxide and forming a ferrous oxide-rich molten slag, (b) introducing the agglomerates onto a carbon bed of a moving hearth furnace; (c) heating the agglomerates in the moving hearth furnace to a temperature sufficient for reducing and melting the agglomerates to produce a ferrous oxide-rich molten slag; (d) metallizing the ferrous oxide of the molten slag by reaction of the ferrous oxide and the carbon of the carbon bed at a furnace temperature sufficient for maintaining the slag in a molten state; and (e) solidifying the slag after metallization of the ferrous oxide to form a matrix of titanium oxide-rich slag having a plurality of metallic iron granules distributed there through; and (f) separating the metallic iron granules from the slag, the slag comprising greater than 85% titanium dioxide based on the entire weight of the matrix after separation of the metallic iron. The disclosure is also directed to a metallization product of a ferrous oxide-rich molten slag.

12 Claims, 4 Drawing Sheets

U.S. PATENT DOCUMENTS

| | | | |
|---|---|---|---|
| 3,218,152 A | 11/1965 | Sasabe | |
| 3,759,693 A | 9/1973 | Kunii et al. | |
| 3,850,615 A * | 11/1974 | Reeves | 75/435 |
| 3,853,536 A | 12/1974 | Tylko | |
| 3,865,574 A | 2/1975 | Long et al. | |
| 3,957,482 A | 5/1976 | Whigham | |
| 4,032,120 A | 6/1977 | Beggs | |
| 4,032,352 A | 6/1977 | Pietsch | |
| 4,049,441 A | 9/1977 | Jaco, Jr. et al. | |
| 4,054,443 A | 10/1977 | Jaco, Jr. | |
| 4,087,275 A | 5/1978 | Beggs | |
| 4,116,679 A | 9/1978 | Pietsch | |
| 4,144,052 A | 3/1979 | Serbent et al. | |
| 4,176,041 A | 11/1979 | Mori et al. | |
| 4,251,267 A | 2/1981 | Beggs et al. | |
| 4,257,806 A | 3/1981 | Fujita et al. | |
| 4,270,739 A | 6/1981 | Ahrendt et al. | |
| 4,381,939 A | 5/1983 | Ahrendt et al. | |
| 4,470,581 A | 9/1984 | Ahrendt et al. | |
| 4,685,964 A | 8/1987 | Summers et al. | |
| 4,701,214 A | 10/1987 | Kaneko et al. | |
| 4,702,766 A | 10/1987 | Love et al. | |
| 4,900,356 A | 2/1990 | Hoffman | |
| 5,435,831 A | 7/1995 | Meissner | |
| 5,601,631 A | 2/1997 | Rinker et al. | |
| 5,674,308 A | 10/1997 | Meisser et al. | |
| 5,730,775 A | 3/1998 | Meissner et al. | |
| 5,782,957 A | 7/1998 | Rinker et al. | |
| 5,865,875 A | 2/1999 | Rinker et al. | |
| 5,873,925 A | 2/1999 | Rinker et al. | |
| 5,885,521 A | 3/1999 | Meissner et al. | |
| 5,997,596 A | 12/1999 | Joshi et al. | |
| 6,036,744 A | 3/2000 | Negami et al. | |
| 6,187,076 B1 | 2/2001 | Sugahara et al. | |
| 6,214,087 B1 | 4/2001 | Hoffman et al. | |
| 6,251,156 B1 | 6/2001 | Hoffman et al. | |
| 6,368,379 B1 | 4/2002 | Tateishi et al. | |
| 6,413,295 B2 | 7/2002 | Meissner et al. | |
| 6,582,491 B2 | 6/2003 | Hoffman et al. | |
| 6,630,010 B2 | 10/2003 | Ito et al. | |
| 6,685,761 B1 | 2/2004 | Hoffman et al. | |
| 2001/0025549 A1 | 10/2001 | Tanigaki et al. | |
| 2001/0027701 A1 | 10/2001 | Ito et al. | |
| 2001/0052273 A1 | 12/2001 | Meissner et al. | |
| 2001/0054329 A1 | 12/2001 | Hoffman et al. | |
| 2002/0114761 A1 | 8/2002 | Akhtar et al. | |
| 2005/0028643 A1 * | 2/2005 | Tanaka et al. | 75/435 |
| 2006/0278040 A1 | 12/2006 | Harada et al. | |

FOREIGN PATENT DOCUMENTS

| | | |
|---|---|---|
| GB | 1491519 | 11/1977 |
| GB | 2189260 | 10/1987 |
| JP | 54040201 | 1/1977 |
| JP | 52108312 | 9/1977 |
| JP | 63042351 | 2/1988 |
| JP | 01031911 | 2/1989 |
| JP | 03060883 | 9/1991 |
| JP | 2000045007 | 2/2000 |
| JP | 2000239752 | 9/2000 |
| WO | WO 00/26420 | 5/2000 |
| WO | WO 00/29628 | 5/2000 |
| WO | WO 00/56941 | 9/2000 |
| WO | WO 01/73137 | 10/2001 |
| WO | WO 2004/081238 | 9/2004 |

OTHER PUBLICATIONS

"New Coal-Based Process to Produce High Quality DRI for the EAF" Yoshitaka Sawa, Tetsuya Yamamoto, Kanji Takeda and Hiroshi Itaya Technical Research Laboratories, Kawasaki Steel Corporation ISIJ International, vol. 41 (2001), Supplement, pp. S17-S21.

International Search Report, Jul. 24, 2007.

* cited by examiner

ORE REDUCTION PROCESS AND TITANIUM OXIDE AND IRON METALLIZATION PRODUCT

CROSS-REFERENCE TO RELATED APPLICATIONS

This application is a continuation of application Ser. No. 11/512,993 filed Aug. 30, 2006, now abandoned, which claims the benefit of U.S. Provisional Application No. 60/712,556, filed Aug. 30, 2005 and U.S. Provisional Application No. 60/788,173 filed Mar. 31, 2006, which are each incorporated by reference in their entireties.

BACKGROUND OF THE INVENTION

1. Field of the Invention

The disclosure relates to a process for the beneficiation of titanium oxide-containing ores. More particularly the disclosure relates to a process for reducing the ore in a moving hearth furnace to form separable iron metal and titanium oxides. The disclosure additionally relates to a titanium and iron metallization product and the product of a process for the beneficiation of titanium oxide-containing ores. More particularly the disclosure relates to a titanium oxides and iron metallization product made by a process for reducing the ore in a moving hearth furnace to form separable iron metal and titanium oxides.

2. Description of the Related Art

Moving hearth furnaces have been described for use in the reduction of iron oxide. Iron oxide to be reduced is charged to the rotary hearth furnace together with a source of carbon wherein the charge is exposed to reducing conditions to form reduction products comprising iron and slag.

In using a relatively pure iron oxide charge, reactivity of molten iron oxide slag with the interior surfaces of the furnace can be a concern. Consequently, that technology tends to use amounts of carbon sufficient for solid state reduction where there is rapid and substantially complete metallization of the iron oxide before the formation, if any, of a molten phase. Consequently, if and when the product of the solid state reduction is melted, there may only be a relatively small metal oxide fraction available to form the slag component. Additionally, since the iron metal represents the majority of the reduction product, large and easily recoverable iron granules form.

A carbon bed may be provided to protect the hearth from contact with the reacting charge. Since the carbon content of the charge is sufficient to provide rapid metallization, any minor proportion of ferrous oxides that might remain to react with the carbon bed would be an incidental and insignificant part of the process.

Instead of using a rotary hearth process to reduce substantially pure iron oxide, a rotary hearth process to reduce low grade ores such as ilmenite which contain iron oxide, high levels of titanium dioxide and metal oxide impurities has been proposed for making reduction products containing metallic iron and high grade titanium oxides such as synthetic rutile. However, reducing a low grade ore such as ilmenite which contains high levels of titanium dioxide and metal oxide impurities in a rotary hearth process poses processing challenges that are not encountered when reducing relatively pure iron oxide.

When conventional rotary hearth reduction technology is used to recover metallic iron and titanium oxides from low grade ores such as ilmenite, separating the small bits of iron metal which are distributed throughout the relatively high slag content is a problem. To solve this separation problem, a first pre-reduction step to metallize the majority of the iron oxide followed by a melting step, usually in an electric melter or intermediate hearth furnace, has been described for forming more readily separable molten iron that is relatively free of gangue and a slag that contains a high titanium oxides content. However, this multi-step process is a costly and energy intensive solution.

Mechanical separation of the numerous small bits of iron metal distributed throughout the slag is impractical because the bits of iron metal tend to be well below 50 microns in diameter. Since 50 microns is the lowest practical size limit for separation by sieving, most fine sieves having 400 wire per inch sieve which is the limit for sieving 50 micron diameter particles, sieving such numerous and small bits of iron metal is not a practical separation process. Small bits of iron can be chemically separated but chemical separation adds significantly to costs.

There is a need for an energy efficient rotary hearth process for recovering easily separable metallic iron and titanium oxides from low grade ore reduction products.

SUMMARY OF THE INVENTION

The disclosure is directed to a process for producing separable iron and titanium oxides from an ore containing titanium oxide and ferric oxide, typically a low grade ore rich in titanium oxides and ferric oxide, even more typically ilmenite, comprising:

(a) forming agglomerates comprising carbon-based materials and the ore, the quantity of carbon of the agglomerates being sufficient for, at an elevated temperature, reducing ferric oxide to ferrous oxide and forming a ferrous oxide-rich molten slag, (b) introducing the agglomerates onto a carbon bed of a moving hearth furnace;

(c) heating the agglomerates in the moving hearth furnace to a temperature sufficient for reducing and melting the agglomerates to produce a ferrous oxide-rich molten slag;

(d) metallizing the ferrous oxide of the molten slag by reaction of the ferrous oxide and the carbon of the carbon bed at a furnace temperature sufficient for maintaining the slag in a molten state;

(e) solidifying the slag after metallization of the ferrous oxide to form a matrix of titanium oxide-rich slag having a plurality of metallic iron granules distributed there through; and (f) separating the metallic iron granules from the slag, the slag comprising greater than 85% titanium dioxide based on the entire weight of the matrix after separation of the metallic iron.

In one embodiment, the reducing and melting of the agglomerates occurs simultaneously. Additionally, the metallizing can be carried out under conditions sufficient for small molten iron metal droplets formed in the molten slag to coalesce into large molten iron metal droplets.

The disclosure is additionally directed to a metallization product of a ferrous oxide-rich molten slag, comprising: a matrix of a titanium oxide-rich slag having a plurality of metallic iron granules distributed there through, the metallic iron granules being mechanically separable from the matrix of titanium oxide, the matrix comprising greater than 85% titanium oxides based on the entire weight of the matrix after mechanical separation of the mechanically separable portion of the metallic iron.

DETAILED DESCRIPTION OF THE INVENTION

The disclosure uses a low grade ore rich in titanium oxides and iron oxides. Titanium present in low grade ore occurs in complex oxides, usually in combination with iron, and also containing oxides of other metals and alkaline earth elements. Titanium is commonly found as ilmenites, either as a sand or a hard rock deposit. Low-grade titanium-rich ores, such as ilmenite sand can contain from about 45 to about 65% titanium dioxide, about 30 to about 50% iron oxides and about 5 to about 10% gangue. Rock deposits of ilmenite are reported to contain from about 45 to about 50% titanium dioxide, about 45 to about 50% iron oxides, and about 5 to about 10% gangue. The process of this disclosure can employ such titanium-rich ores.

Agglomerates, useful as the charge to the rotary hearth process, comprise the ore and a quantity of carbon sufficient for a first stage melting wherein ferric oxide reduction to ferrous oxide occurs under reducing conditions. The exact amount of carbon will vary depending upon the iron oxide content of the ore, and particularly upon the ferric oxide content. But, less than stoichiometric quantities of carbon (i.e., quantities of carbon sufficient to reduce all the iron oxides in the ore to metallic iron) are used so that the agglomerates will melt before a second stage metallizing wherein the majority of the ferrous oxide reduction to iron metal occurs. A minor degree of such metallizing may occur in the first stage and is not detrimental to the process of this disclosure.

When the amount of carbon is referred to it means the fixed carbon content of the material which provides a source of carbon. Fixed carbon content is determined in the proximate analysis of solid fuels, such as coal, by heating a sample, in the absence of air, to 950° C. to remove volatile matter (which typically includes some carbon). The carbon that remains in the ash at 950° C. is the fixed carbon content.

For a typical ore that can be used in the process of this disclosure and containing about 30 to about 50% iron oxides, the amount of carbon can range from about 0.5 to about 8.0 wt. %, more typically about 1.0 to about 6.0 wt. % based on the entire weight of the agglomerate. For ilmenite and/or sand containing ilmenite, the amount of carbon can range from about 1.0 to about 8.0 wt. %, more typically about 2.0 to about 6.0 wt. % based on the entire weight of the agglomerate. For rock deposits of ilmenite, the amount of carbon can range from about 0.5 to about 5.0 wt. %, more typically about 1.0 to about 3.0 wt. % based on the entire weight of the agglomerate.

Typically the amount of carbon in the agglomerates is sufficient for reducing the ferric oxide but insufficient to metallize more than about 50% of the ferrous oxide, more typically insufficient to metallize more than about 20% of the ferrous oxide based on the agglomerate.

The carbon source useful in the agglomerates can be any carbonaceous material such as, without being limited thereto, coal, coke, charcoal and petroleum coke.

Agglomerates are formed by mixing the ore and the carbon source, optionally together with a binder material, and shaping the mixture into pellets, briquettes, extrudates or compacts which are usually dried at temperatures ranging from about 100 to about 200° C. Equipment capable of mixing and shaping the feed components are well known to those skilled in the art. Typically the agglomerates range in average diameter from about 2 to about 4 cm for ease of handling.

The optional binder material can be, without limitation thereto, organic binders or inorganic binders such as bentonite or hydrated lime. Suitable amounts of binder range from about 0.5 to about 5 wt. %, typically about 1 to about 3 wt. % based on the entire weight of the agglomerates.

Unlike typical ore reduction processes, the ore of the agglomerates can be used without being ground into a fine powder. The ore may, however, be crushed and/or screened, before being formed into agglomerates, to an average particle size ranging from about 0.1 to about 1 mm to separate out any large chunks which might pose handling problems. For example, when rock deposits are used, they are usually crushed and screened to obtain ore particles ranging in average size of about 0.1 to about 1 mm.

The agglomerates are charged to a rotary hearth furnace wherein they are heated to a temperature sufficient for the first stage melting to produce a ferrous oxide-rich molten slag. In a typical process, the agglomerates are charged through a feed chute which deposits them onto a bed of carbonaceous material, typically a bed of coal or coke particles. The thickness of the bed can range from about 1 to about 5 cm.

The temperatures inside the moving hearth furnace sufficient for the first stage melting can range from about 1300° C. to about 1800° C., typically from about 1400° C. to about 1750° C., and more typically from about 1500° C. to about 1700° C. The particular temperature will depend on ore composition. The period of time for this melting stage can range from about 1 minute to about 5 minutes.

In the first stage melting, the carbon content of the agglomerates is sufficient to reduce the ferric oxide to ferrous oxide, but insufficient to complete any substantial metallization and, additionally, not sufficient for the complete reduction of ferrous oxide to iron metal.

The ferrous oxide-rich molten slag which results from the first stage melting, contacts the carbon bed under reducing conditions. Through this contact, the ferrous oxide is further reduced in the second stage metallizing to produce the iron metal product.

The temperature inside the moving hearth furnace in the second stage metallizing is sufficiently high to keep the slag in a molten state as the ferrous oxide metallization occurs. Suitable temperatures inside the hearth furnace for this purpose can range from about 1500° C. to about 1800° C., typically from about 1600° C. to about 1750° C., and more typically from about 1600° C. to about 1700° C. The particular temperature required will vary depending upon ore composition.

On a large scale furnace, the temperature inside the furnace in the first stage can be at least about 100° C. lower than the temperature in the second stage.

The period of time for this second stage metallizing can be longer than that for the first stage melting and can range from about 5 minutes to about 20 minutes. During the first stage, reduction of ferric oxide in the presence of the carbon contained in the agglomerates and melting occur rapidly. In contrast in the second stage, allowing sufficient time for the ferrous oxide-rich molten slag to flow over the carbon bed during the metallization can enhance production of large metal particles since the iron droplets of the molten slag will coalesce into larger droplets which maintain their size during cooling to form solid metal particles.

As the second stage metallization proceeds, the slag becomes less fluid and the titanium concentration of the slag increases. The conditions sufficient for maintaining slag fluidity can help the iron droplets in the molten slag to coalesce which facilitates the formation of the easily separable large particles of iron.

The slag solidifies as the metallization approaches completion. Preferably, the metallization is carried out until at least about 90% completion, based on the agglomerates, even more preferably until at least about 95% completion. The iron metal which can be in the form of large granules is readily separable from the solid slag by cost effective processes. Mechanical processes are ideally used for separating the iron metal. Chemical processes such as chemical leaching are not needed. Additionally extensive mechanical separation processes such as intensive grinding are not needed.

Typical methods for separating the metal include crushing, grinding, screening and magnetic separation.

Typically the iron granules of the process range in average diameter from about 0.05 to about 10 mm, and more typically from about 0.1 to about 5 mm. The term "granules" is used to distinguish the large chunks of metallic iron produced by the process of this disclosure as compared to the small particles of metallic iron resulting from conventional processes.

Typically, the solid slag product of the process comprises greater than about 85% titanium oxides, and more typically greater than about 87% titanium oxides, based on the entire weight of the solid slag product, after separation of the mechanically separable metallic iron. The term "titanium oxides" means $TiO_2$, $Ti_3O_5$, and $Ti_2O_3$. The solid slag product may also contain smaller amounts of titanium in the form of TiO, TiC and TiN. The solid slag product may contain a minor amount of residual metallic iron. The residual metallic iron is usually the portion of metallic iron particles below about 50 microns in diameter. Usually the amount of residual metallic iron is less than about 6%, more typically less than about 4% based on the entire weight of the solid slag product, after mechanical separation of the mechanically separable metallic iron granules. There may be other small amounts of impurities such as FeO, and other oxides. The amount of these other impurities is usually less than 8% and more typically less than 6% of the entire weight of the solid slag product.

The moving hearth furnace can be any furnace which is capable of exposing the agglomerates to at least two high temperature zones on a bed of carbon. A suitable furnace can be a tunnel furnace, a tube furnace or a rotary hearth furnace. The process can employ a single furnace structure.

Figure 1:
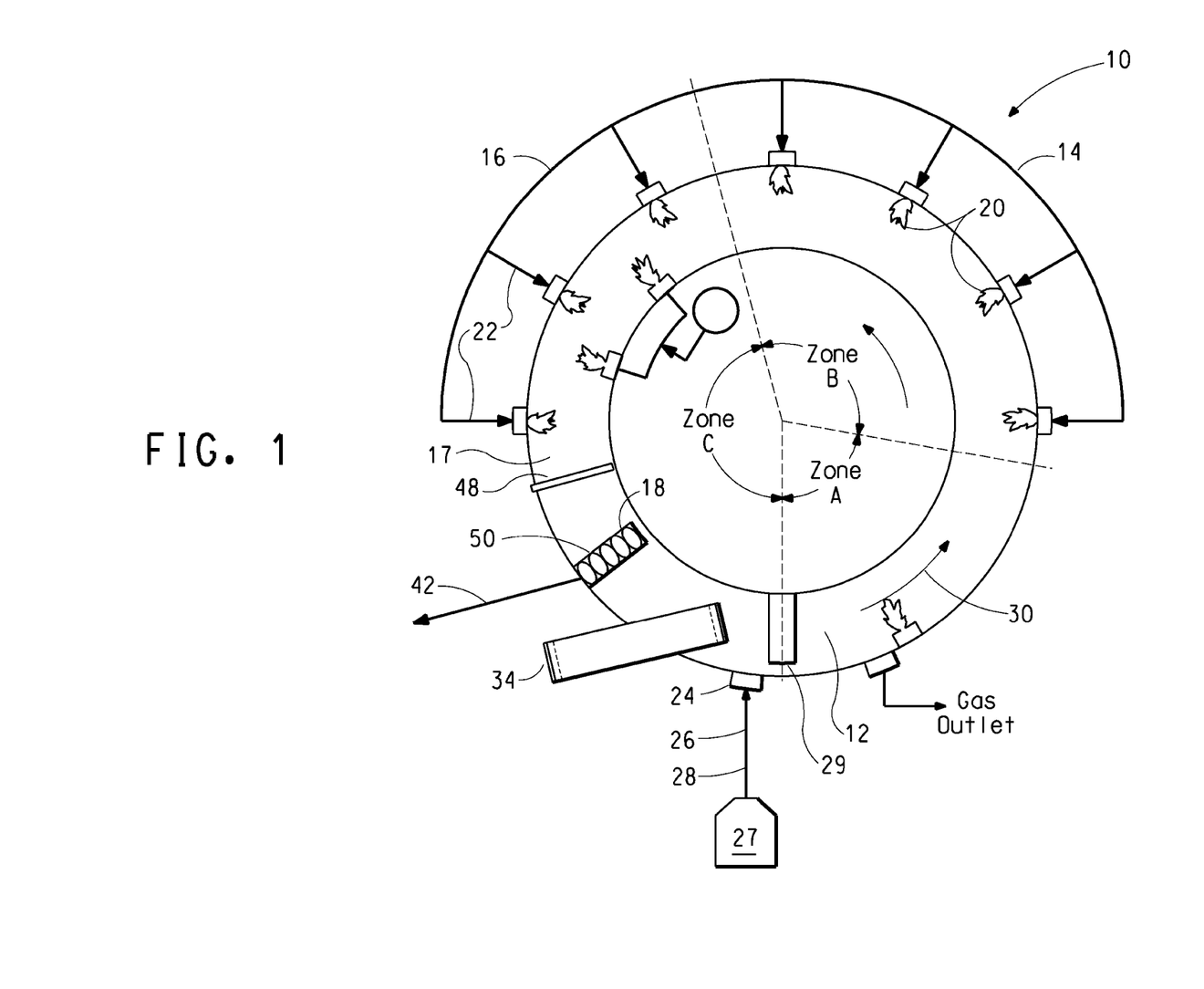
FIG. 1 is a top view of a rotary hearth furnace for the reduction of titanium-rich ores and production of iron metal and high grade titanium oxides.

Referring to the drawings and more particularly to FIG. 1, a rotary hearth furnace is used for reducing the charge. A furnace 10 is used having dimensions of a typical hearth furnace used in the iron production industry. The rotary hearth furnace has a surface 30 that is rotatable from a feed material zone 12. The surface 30 can be a refractory layer surface or a vitreous hearth layer, both of which are well known in the art of hearth furnace processing of iron ores. The surface rotates from the feed material zone through a plurality of burner zones 14, 16, 17, a reaction zone spanning at least a portion of the burner zones and a discharger zone 18 that comprises a cooling plate 48 and discharge device 28. The maximum temperature of the furnace is typically reached in zone 17. The first and second stages of the process of this disclosure occur in the reaction zone. The surface 30 is rotatable in a repetitive manner from the discharge zone 18 to the feed material zone 12 and through the reaction zone for continuous operation. The burner zones can each be fired by a plurality of air/fuel, oil fired, coal fired or oxygen enriched burners 20 and 22.

The feed material zone 12 includes an opening 24 and a feed mechanism 26 by which the agglomerates are charged to the furnace. A layer comprising carbon is located on at least a major proportion of the surface 30, typically the entire surface comprises a layer comprising carbon and upon which the agglomerates are placed. The layer comprising carbon may be placed on the surface by any convenient means, typically by a solid material conveyor 34. The agglomerates can be leveled to a useful height above the surface by a leveler 29 that spans the width of the surface 30. The agglomerates are continuously fed to the furnace by the feed mechanism as the surface is rotated around the furnace and through each zone. The speed of rotation is controlled by adjusting a variable speed drive.

Figure 2:
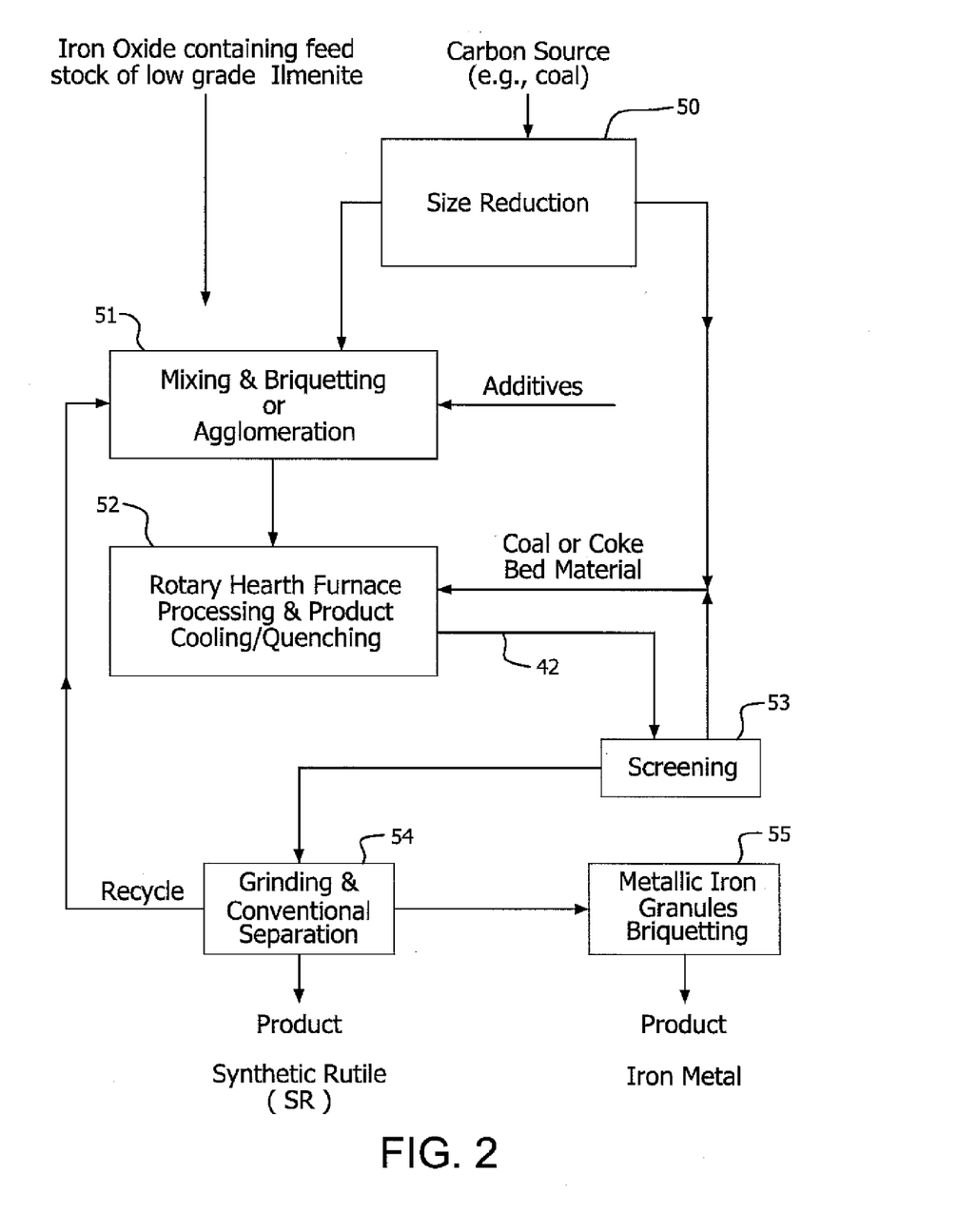
FIG. 2 is a simplified schematic diagram of the process of this disclosure.

Referring to FIG. 2, the process is shown whereby the ore is introduced to the mixing zone 51. The carbon can be introduced to a size reduction zone 50 prior to introduction to the mixing zone 51 wherein the ore and the carbon together with any optional additives, such as binders, are mixed together and formed into agglomerates. The agglomerates are introduced to rotary hearth furnace zone 52 wherein the ferric oxide of the agglomerates is reduced and metallized as described herein. The hot product 42 as shown in FIG. 1 is cooled by any convenient means. The cooled product is then screened in the screening zone 53, then ground in grinding zone 54 to separate the iron metal from the high grade titanium oxides product. Recycle material can also be separated and introduced to the mixing zone 51. The iron metal product may be formed into briquettes in briquetting zone 55 from which the iron metal product is withdrawn.

Alternately, on a smaller scale, tube furnaces of conventional design using a high purity alumina tube as a retort may be used. These furnaces may be heated to temperatures of about 1500° C. to about 1700° C., and operated under a nitrogen or argon atmosphere.

In another embodiment of the disclosure, coal or coke particles are added to the charge during the second phase metallization in order to provide more reductant contact thereby enhancing the metallization process In yet another embodiment of the invention the undersized slag (synthetic rutile) and iron-synthetic rutile composites are separated from the titanium oxides product and recycled to the process.

In one embodiment, the invention herein can be construed as excluding any element or process step that does not materially affect the basic and novel characteristics of the composition or process. Additionally, the invention can be construed as excluding any element or process step not specified herein.

Applicants specifically incorporate the entire content of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

EXAMPLES

The following Examples illustrate the present invention. All parts, percentages and proportions are by weight unless otherwise indicated. Particles sizes of less than 75 microns were determined by analysis of electron micrograph images while larger sizes were determined by sieving.

Example 1

In this Example the agglomerates contained too much carbon.

Tablets were prepared by mixing and compacting together, at ambient temperature, 79.7 percent by weight ilmenite ore (61% $TiO_2$, based on the total weight of the ore), and 20.3 percent coal (71% fixed carbon, based on proximate analysis) into cylinders 20 mm in diameter and 7 mm thick. Residual water was removed from the tablets by drying. The dried tablets were placed on a bed of coke breeze in an alumina crucible and moved into a tube furnace which had been heated to 1600° C. under a nitrogen atmosphere. The tube furnace is of conventional design using a high purity alumina tube as a retort. The furnace temperature dropped on the order of about 50° C. when the tablets were initially added. The temperature increased back to the starting temperature. 25 minutes after the tablets were added, the tablets were removed from the furnace and allowed to cool. The tablets retained their original shape which indicated that the tablets did not melt. Iron metallization was found to be essentially 100%. The average metallic iron particle size was about 15 microns. This iron could not be readily separated from the titanium oxide-rich phase. The size distribution of the resulting product indicated that the separation would be difficult. Attempts to separate iron particles of this size by grinding followed by magnetic separation were unsuccessful because of small particle sizes. The titanium oxide component of the resulting ground and separated product contained too much iron while the iron component contained too much titanium oxide.

Figure 3:
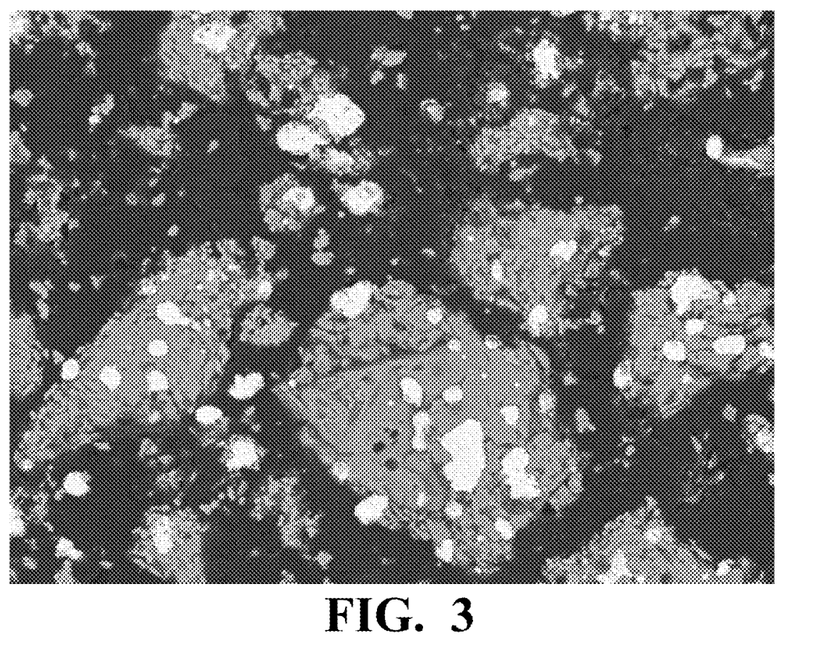
FIG. 3 is an electron micrograph of 75 micron size slag product of Example 1. Full field width is 115 microns.

An electron micrograph of full field width 115 microns of the product of this Example after grinding is shown in FIG. 3 (ground product particles were mounted in resin, cut, polished and imaged in the electron microscope such that residual iron particles appear bright and titanium oxide-rich material appears grey). As shown in FIG. 3, the slag matrix contained many small (less than 10 micron) particles of metallic iron which could not be effectively removed by typical grinding and sieving separation processes.

Example 2

In this Example the temperature inside the furnace was too low. Tablets were prepared by mixing and compacting together, at ambient temperature, 95.5 percent by weight ilmenite ore (61% $TiO_2$, based on the total weight of the ore), 3 percent coal (71% fixed carbon), and 1.5 percent wheat flour binder into cylinders 20 mm in diameter and 7 mm thick. A small amount of binder was needed because of the lower carbon content of the tablets. Residual water was removed from the tablets by drying. The dried tablets were placed on a bed of coke breeze in an alumina crucible and moved into a tube furnace which had been heated to 1600° C. under a nitrogen atmosphere. The furnace temperature dropped on the order of about 50° C. when the tablets were initially added. The temperature gradually increased back to the starting temperature. 25 minutes after the tablets were added, the tablets were removed the tablets were removed from the furnace and allowed to cool. Distortion and glassy appearance indicated that the tablets had melted and re-solidified. Iron metallization was found to be less than 60%. The average metallic iron granule size was about 75 microns. While the metallized iron could be separated, a substantial amount of un-metallized iron remained intimately mixed with the titanium oxides.

Example 3

Tablets were prepared by mixing and compacting together, at ambient temperature, 93.5 percent by weight ilmenite ore (61% TiO2), 5.5 percent coal (71% fixed carbon), and 1 percent wheat flour binder into cylinders 20 mm in diameter and 7 mm thick. Residual water was removed from the tablets by drying. The dried tablets were placed on a bed of coke breeze in an alumina crucible and moved into a furnace which had been heated to 1675° C. under an argon atmosphere. The furnace temperature dropped on the order of about 50° C. when the tablets were initially added. The temperature gradually increased back to the starting temperature. 25 minutes after the tablets were added, the tablets were removed and allowed to cool. Distortion and glassy appearance indicated that the tablets had melted and re-solidified. Iron metallization was found to be greater than 95% based on quantitative x-ray diffraction analysis. The average metallic iron granule size was more than 500 microns with 95% of the entire amount of separated granules greater than 75 microns. Nearly all of the iron could be removed from the finer, titanium oxide-rich phase by crushing and sieving with a 200 mesh sieve. Elemental analysis by inductively-coupled plasma atomic emission spectroscopy determined that the titanium oxide-rich phase contained 87% titanium oxide (titanium content reported as $TiO_2$ and the sum with remaining iron metal and other metal oxide concentrations normalized to 100%). X-ray diffraction analysis indicated that the titanium was mostly present as Ti3O5 with some Ti2O3.

Figure 4:
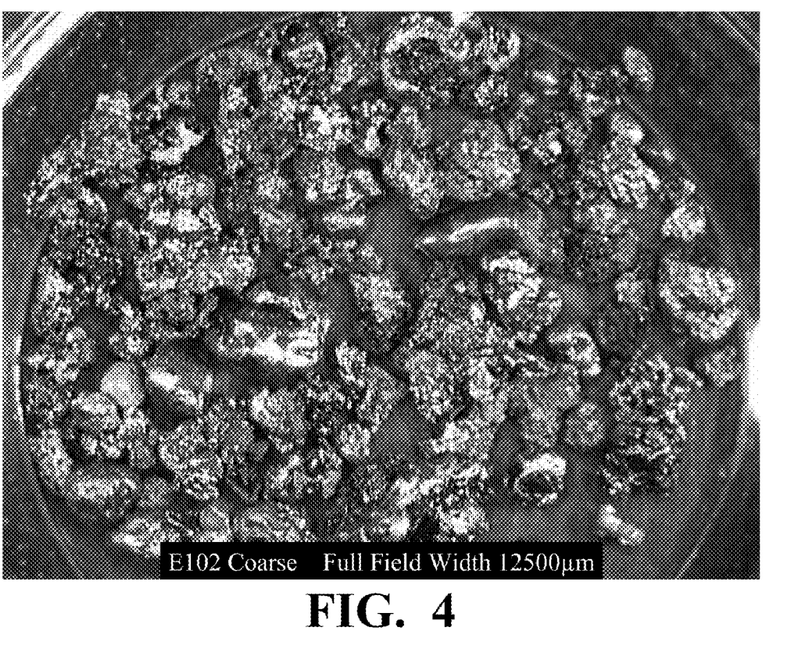
FIG. 4 is a photographic image of the separated iron granules of the product of Example 3. Full field width is 12500 μm

FIG. 4 is a photographic image (full field width 12.5 mm) of the iron granules which were mechanically separated from the product made according to Example 3.

Figure 5:
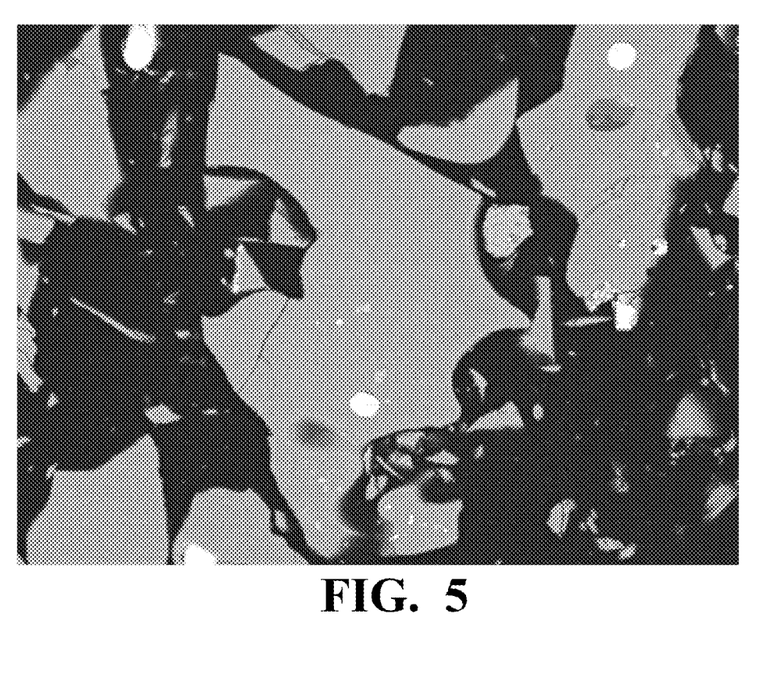
FIG. 5 is an electron micrograph of less than 75 micron size slag product after separation of iron granules of Example 3. Full field width is 115 microns.

FIG. 5 is an electron micrograph (full field width 115 microns) of the less than 75 micron slag product after grinding and removal of the iron granules by sieving (separated slag product particles were mounted in resin, cut, polished and imaged in the electron microscope such that residual iron particles appear bright and titanium oxide-rich material appears grey). Comparing FIG. 5 with FIG. 3, the ground product of FIG. 3 contained a significant content of iron metal and the iron metal particles were small, making them difficult to separate by mechanical means. However, the slag product shown in FIG. 5 shows few particles of iron metal remaining within the solid slag product after separation of the larger iron metal granules (FIG. 4) by grinding and sieving.

Figure 6:
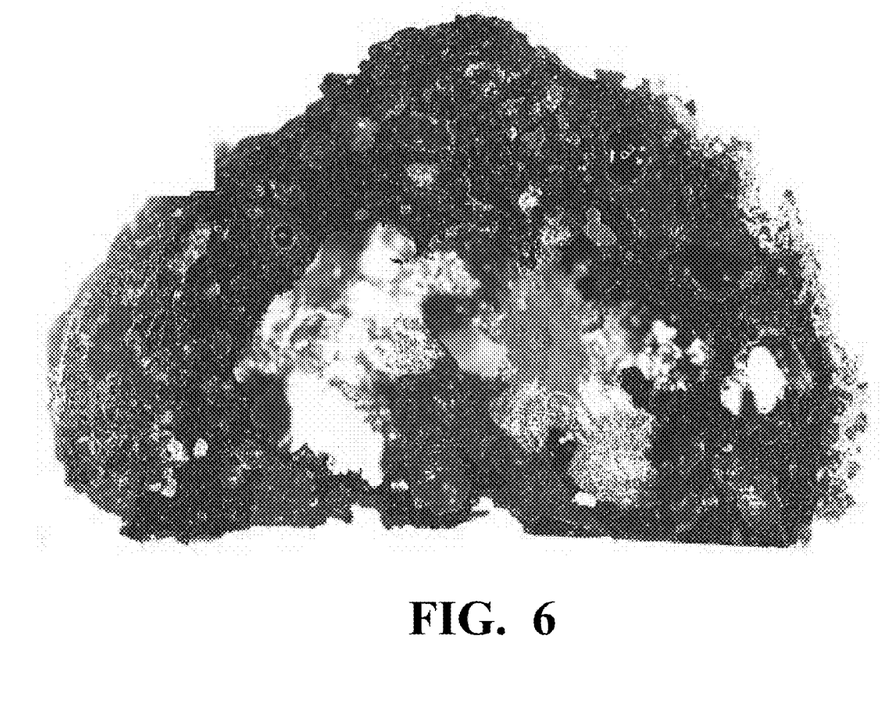
FIG. 6 is an optical micrograph of a metallization product of a process similar to Example 3 before grinding.

FIG. 6. is a polished cross section of a product of a process similar to Example 3 before grinding. Even at the relatively large scale of the figure, some of the iron granules are visible.

The description of illustrative and preferred embodiments of the present invention is not intended to limit the scope of the invention. Various modifications, alternative constructions and equivalents may be employed without departing from the true spirit and scope of the appended claims.

What is claimed is:

1. A process for extracting titanium oxide and iron from an ore, comprising the steps of:
   (a) providing an ore comprising ferric oxide, ferrous oxide, and titanium oxide at ambient temperatures;
   (b) mixing the ore with one or more carbon source to form one or more agglomerates so that the ferric and the ferrous oxides are not substantially reduced by the one or more carbon source during this step;
   (c) introducing the one or more agglomerates onto a carbon bed of a single moving hearth furnace;
   (d) heating the one or more agglomerates on the carbon bed in the range of about 1300 C to about 1800 C to reduce the ferric oxide to ferrous oxide and to melt the one or more agglomerates to form a ferrous oxide-rich molten slag to begin metallizing the ferrous oxide, wherein the amount of the one or more carbon source used in step (b) is such so that without the participation of carbon present in the carbon bed, the carbon amount would be insufficient for metallizing more than 50% of the ferrous and ferric oxides in steps (d) and (e);
   (e) heating the one or more agglomerates on the carbon bed to a maximum temperature of greater than 1500 C to reach the desired extent of metallization by reaction with the carbon bed, so that the ferrous oxide-rich molten slag becomes a titanium oxide-rich slag that comprises large iron droplets;
   (f) cooling the titanium oxide-rich slag until the titanium oxide-rich slag solidifies and comprises solid iron metal granules; and
   (g) mechanically separating the solid iron metal granules from the titanium oxide-rich slag;
   whereby steps (c), (d), and (e) occur in the single moving hearth furnace.

2. The process of claim 1 herein the ore is a low grade ore rich in titanium oxides, ferrous oxide, and ferric oxide.

3. The process of claim 1 herein the one or more agglomerates have a quantity of carbon source that is less than a stoichiometric quantity.

4. The process of claim 1 herein the ore contains about 30 to about 50% ferrous and ferric oxides.

5. The process of claim 4 wherein the amount of the one or more carbon source is from about 0.5 to about 10 weight percent, based on the entire weight of the one or more agglomerates.

6. The process of claim 1 wherein the ore is ilmenite.

7. The process of claim 1 wherein the ore is ilmenite sand and the amount of one or more carbon source is about 1.0 to about 8.0 weight percent, based on the entire weight of the one or more agglomerates.

8. The process of claim 1 wherein the ore is ilmenite rock.

9. The process of claim 1 wherein the one or more agglomerates formed from the mixing in step b comprise a plurality of ore particles ranging in average particle size diameter from about 0.1 to about 1.0 mm.

10. The process of claim 1 wherein the moving hearth furnace is a tunnel furnace, a tube furnace, or a rotary hearth furnace.

11. The process of claim 1 wherein the amount of the one or more carbon source is insufficient to reduce and metallize more than about 20 % of the ferric and ferrous oxides in step (d).

12. The process of claim 1, wherein the one or more agglomerates of step (b) are heated to drying temperatures of about 100 to 200 C.

* * * * *